United States Patent [19]

Meier

[11] Patent Number: 4,565,216

[45] Date of Patent: Jan. 21, 1986

[54] DEVICE FOR GRAVIMETRIC DISTRIBUTION OF LIQUID FOR MASS AND HEAT TRANSFER COLUMNS

[75] Inventor: Werner Meier, Elgg, Switzerland

[73] Assignee: Sulzer Brothers Limited, Winterthur, Switzerland

[21] Appl. No.: 584,509

[22] Filed: Feb. 28, 1984

[30] Foreign Application Priority Data

Mar. 1, 1983 [CH] Switzerland ............ 1111/83

[51] Int. Cl.$^4$ .............................................. F16L 41/00
[52] U.S. Cl. ................................................ 137/561 A
[58] Field of Search ......................... 137/561 R, 561 A

[56] References Cited

U.S. PATENT DOCUMENTS

| | | |
|---|---|---|
| 2,059,255 | 11/1936 | Lassiat ............................. 137/561 A |
| 3,704,723 | 12/1972 | Wheaton, III et al. ........... 137/561 A |
| 3,795,259 | 3/1974 | Brandin et al. .................. 137/561 A |
| 4,299,553 | 11/1981 | Swaroop .......................... 137/561 A |
| 4,333,629 | 7/1982 | Roy .................................. 137/561 A |

FOREIGN PATENT DOCUMENTS 703029 4/1931 France .
537208 7/1973 Switzerland .

Primary Examiner—A. Michael Chambers
Attorney, Agent, or Firm—Kenyon & Kenyon

[57] ABSTRACT

The liquid distributing device provides for a gravimetric distribution of liquids to mass and heat transfer columns. The device employs a container with pipe outlets, a plurality of individual distributors in the form of manifolds and metering devices between the container and individual distributors for metering the partial flows of liquid to the individual distributors. The device is particularly suitable for columns having a large cross-section and insures a uniform distribution of liquid even where the column or device is inclined.

8 Claims, 4 Drawing Figures

DEVICE FOR GRAVIMETRIC DISTRIBUTION OF LIQUID FOR MASS AND HEAT TRANSFER COLUMNS

This invention relates to a device for gravimetric distribution of liquids. More particularly, this invention relates to a device for gravimetric distribution of liquid for mass and heat transfer columns.

As is known, various types of columns require liquid distribution devices which can distribute liquid uniformly over the cross-section of the column. In some cases, the columns have been constructed with exchange portions made up of ordered packing members such as corrugated-plate like elements or of irregular heaps of packing members such as Raschig rings or Berl saddles. Such columns can be used, for example, for distillation, rectification, extraction, absorption, separation of isotopes from a substance in a chemical exchange reaction or heat exchange between a liquid and a vapor or gaseous medium.

As is known, the efficiency of the columns, i.e. a separating effect in one case and a heat transfer effect in another case, is closely dependent on a uniform fine distribution of liquid over the surface of a mass transfer portion. Of the large number of known liquid distributors, some frequently used types will be mentioned hereinafter.

The most frequently used devices for gravimetric distribution of liquid are perforated or screen trays or channel, box or pipe distributors. In these distributors, the liquid spreads over the entire width of the cross-section and is communicating, that is, within a closed system. The liquid is conveyed exclusively by gravity through the distribution system.

Other known distribution systems, e.g. as described in French PS No. 703 029, comprise a set of channels supplied from a central container. In this system, the channels, feed channels to the channels and the central container have an overflow system, e.g. spouts, through which liquid flows from the container through the feed channels and channels into the column. It has been found in practice, however, that liquid distributors operating as aforementioned or on a similar principle cannot achieve the desired uniform sprinkling, and thus the separating power is greatly reduced.

The reasons are clear. In overflow systems of the kind in question, e.g. overflow spouts, the overflow height at the spouts is only a few millimeters, i.e. if the distribution system is even only slightly inclined or there are differences in level due to the flow of liquid in the feed channels to the channels or in the channels themselves, the liquid is nonuniformly supplied to the column.

In other known distributors, the liquid is sprayed through nozzle-like devices over the column cross-section. These distributors, however, require pumps for conveying the liquid. They also produce a non-uniform distribution of liquid, since the spray cones of the nozzles overlap and no liquid at all reaches some parts of the column cross-section.

All these distributors have the serious disadvantage that the liquid cannot be uniformly distributed if the column diameter is large, e.g. 3–10 meters.

As is known, gravimetric liquid distributors are based on the same physical fundamental law, i.e. Torricelli's theorem:

$$V = \sqrt{2gh},$$

where V is the outflow speed in meters per second (m/s), g is acceleration due to gravity in meters per second per second (m/s/s) and h is the head of liquid in meters (m). It follows from the equation that the outflow speed V is proportional to the square root of the head of liquid, i.e. the feed height. However, there are limits to the feed height, for reasons of cost and space.

Usually the loading range (loading = amount of liquid per unit time and column cross-sectional area) of columns is between 30 and 100%. Consequently at minimum loadings, i.e., 30%, the liquid feed height is up to 9 times smaller as at maximum loading.

For the previously-mentioned reasons, the liquid feed height at minimum loading cannot reasonably exceed 50 millimeters (mm).

If a distributor is inclined e.g. 0.5% to the horizontal, if the column diameter is large, e.g. 5 meters (m) and if the head of liquid is 25 millimeters (mm), most of the liquid will flow to only half the column.

Even if the head is 100 millimeters (mm), the difference under the same conditions between the amount of liquid at one side and at the diametrically opposite side of the column will still be 13%.

This non-uniform distribution of fluid, also called maldistribution, reduces the efficiency, i.e. the separating power in rectification columns.

The term "maldistribution" denotes any deviation of the flow profile from ideal piston flow, e.g. non-uniform loading with liquid or varying composition of liquid across the column cross-section. Maldistribution is characterized by two main quantities. The first is the extent of maldistribution and gives the size of the deviation of local liquid loading or liquid composition from the ideal mean value. The second quantity describes the structure of this non-uniform distribution, more particularly the distance between the maximum and minimum liquid loading.

In practice, a non-uniform distribution of this kind is frequently approximated by a cosine function, the extent of maldistribution corresponding to amplitude and the distance between maxima and minima corresponding to half the wave-length L.

The theory of maldistribution gives information about the effect of both the amplitude and the wavelength of maldistribution on the efficiency of a column. FIG. 1 shows these influences on a distillation column. In FIG. 1, the wave-length of maldistribution, assumed to be a cosine function, is shown in relation to the column diameter (L/D).

The efficiency of the column decreases with increasing extent of maldistribution. For an equal extent, the influence of maldistribution is small if the area is small, i.e. when the wave-length L is small compared with the column diameter D. When maldistribution covers a larger area, however, its influence is correspondingly greater on the efficiency of columns. Efficiency reaches a minimum when the wave-length L of maldistribution is equal to two column diameters (L/D=2).

For these reasons, the liquid distributor construction must be such as to substantially avoid large-area maldistribution and keep the extent of maldistribution at a minimum.

However, conventional distributors all produce maldistribution over a large area. This is because of the complexity of flow conditions in distributors, which increases with column diameter, and the resulting non-uniform flow. In addition, distributors can never be exactly horizontally levelled, and this also results in maldistribution. Because of their large dimensions, distributors may sag, likewise producing large-area maldistribution.

Distributors having overflows, i.e. V-shaped slots or spouts, are specially sensitive to out-of-levelness. In such cases, the maximum overflow height is a few millimeters. Even if the system is divided into a number of individual distributors individually supplied from a central container, even the slightest skewing or turbulence in the liquid flow will produce large differences in the amount of outflowing liquid, i.e. non-uniform distribution of liquid.

Accordingly, it is an object of the invention to provide a device for a uniform gravimetric distribution of liquid into columns having diameters of three meters or more.

It is another object of the invention to provide a liquid distribution device which insures a substantially uniform distribution of liquid in cases where the device may be inclined to the horizontal.

It is another object of the invention to provide a liquid distribution device which avoids large-area maldistribution.

It is another object of the invention to provide a liquid distributor which insures a substantially uniform composition of a liquid distributed over a column cross-section.

Briefly, the invention provides a device for gravimetric distribution of liquid for material and heat exchange columns. The device is comprised of a container for receiving a supply of liquid, a plurality of individual distributors disposed below and communicating with the container to receive liquid therefrom and a plurality of metering devices. Each metering device is disposed between the container and a respective distributor in proportion to the cross-sectional area of the distributor to the total cross-sectional area of the distributors.

The distributor is simple in design and provides a main factor in achieving high separating power or optimum heat transfer in a column.

An important feature of the liquid distribution device is that all the liquid to be distributed is supplied from a single place, namely from the container via the metering devices in partial streams to the individual distributors. These partial streams are proportional to the partial areas of the column cross-section supplied by the individual distributors.

Advantageously, but not necessarily, the container and metering devices are disposed at the center of a column cross-section.

There can be any number of individual distributors and metering devices so that the aforementioned disadvantages of the known distributors are avoided.

The construction of the device is such that maldistribution can be kept small, irrespective of the column diameter. Further, the device produces a substantially uniform distribution of liquid even in columns constructed, for example on floating production facilities which are subjected to wave motion.

These are other objects and advantages of the invention will become more apparent from the following detailed description taken in conjunction with the accompanying drawings wherein.

Figure 1:
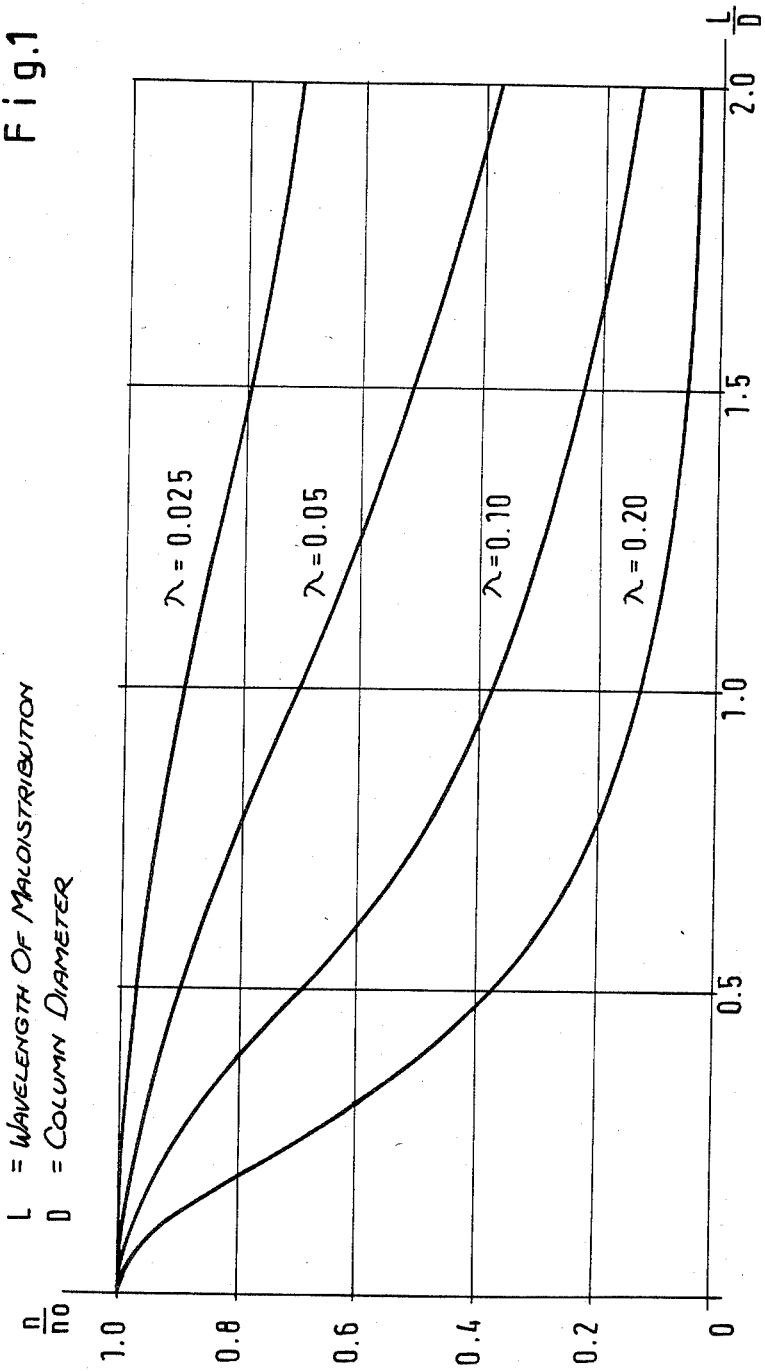
FIG. 1 illustrates the "Effect of Maldistribution on the Separation Power of A Distillation Column".
Figure 2:
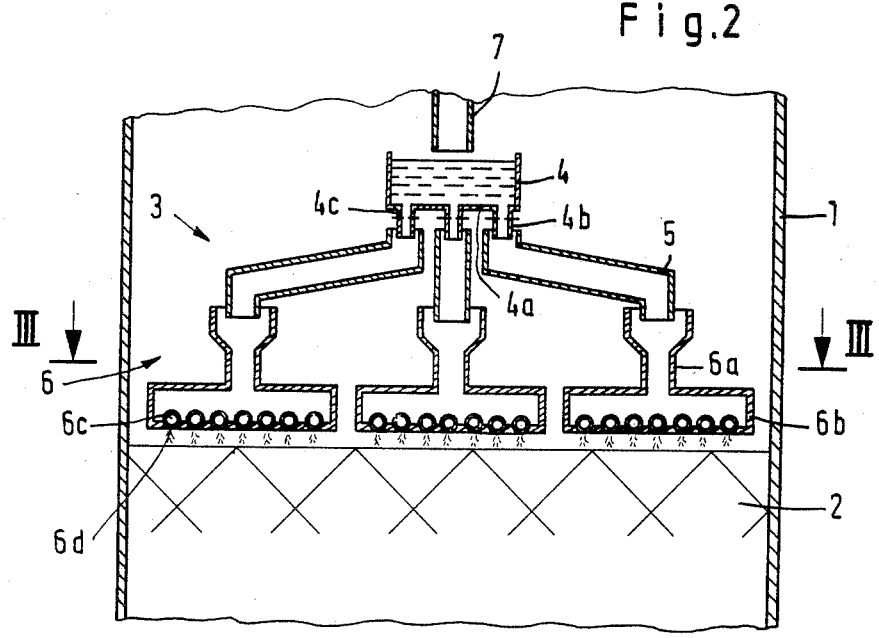
FIG. 2 illustrates a view taken on line II—II of FIG. 3 of a vertical column employing a liquid distributor according to the invention.
Figure 3:
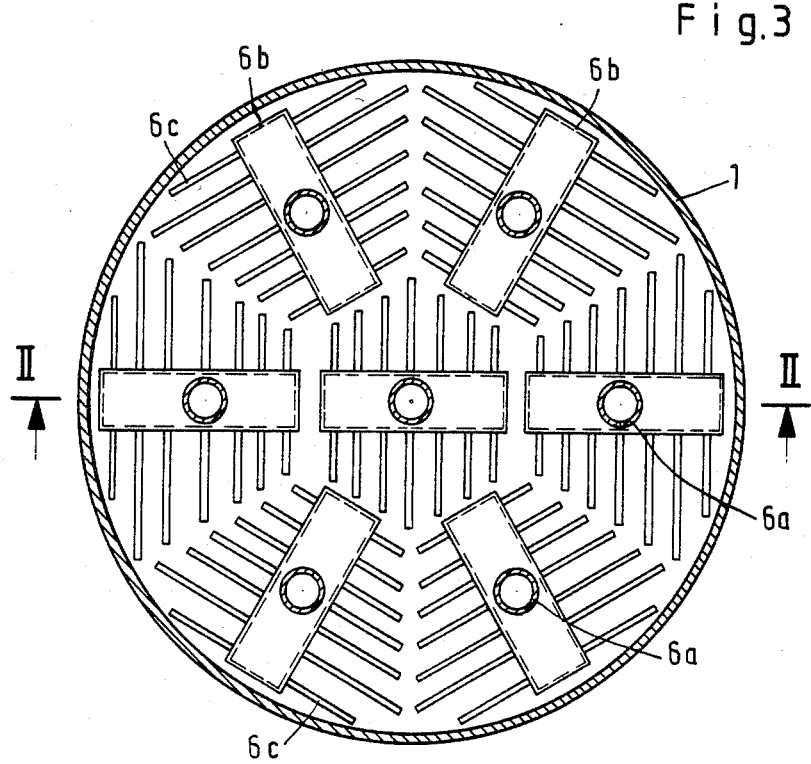
FIG. 3 illustrates a view taken on line III—III of FIG. 2.

Referring to FIGS. 2 and 3, a mass transfer column 1, for example of cylindrical-cross-section of a diameter of at least three meters has a mass transfer portion 2 which is comprised of packing members having an ordered structure. Disposed above this material exchange portion 2 is a device 3 for a gravimetric distribution of liquid onto the exchange portion 2.

The liquid distribution device or liquid distributor 3 rests on a grating (not shown) and includes a container 4 which is centrally disposed within the column 1 so as to receive a supply of liquid, for example via a supply pipe 7. In addition, the container 4 has a bottom 4a in which a plurality of pipe outlets 4b are disposed in order to dispense individual flows of liquid.

In addition, the device has a plurality of flow channels 5, each of which extends from a respective pipe outlet 4b in vented manner, as shown to receive and convey a flow of liquid from the container 4. The flow channels 5 extend outwardly of the container to deliver liquid to a plurality of individual tube distributors 6. As indicated, each distributor includes a feed pipe 6a which communicates a respective flow channel 5 invented manner with an individual pipe manifold 6b. Each manifold 6b is also connected at the bottom and at opposite sides to a plurality of pipes 6c which extend to the end region of the part of the cross-section of the column 1 to be supplied as indicated in FIG. 3.

As shown in FIG. 2, the underside of each pipe 6c has liquid outlet openings 6d through which liquid can be uniformly distributed over the entire cross-section of the material exchange portion 2.

Referring to FIG. 2, the liquid distributor also has a plurality of orifices 4c disposed as metering devices, each of which is disposed within a respective pipe outlet 4b. As illustrated, all of the metering devices 4c are placed at the same height so that the same hydrostatic head is obtained. In this way, the proportions of individual partial quantities of liquid remain constant over the entire liquid loading range. It is important for the level of liquid to be above the metering devices 4c at a minimum distance depending on operating conditions, for example the distance should be at least 50 millimeters.

During operation, the metering devices meter an amount of liquid to the respective distributors 6 in proportion to the cross-sectional area of the distributor to the total cross-sectional areas of all of the distributors 6. In this regard, the flow channels 5 must be dimensioned and vented so as not to impair the action of the metering devices 4c.

Instead of using orifices 4c, the metering devices can be in the form of valves, nozzles, throttles, or other throttle means.

Referring to FIG. 3, in the illustrated embodiment, the entire cross-section of the column 1 is divided relative to the liquid distributor into seven portions, only three of which are shown in FIG. 2.

Since mass transfer columns normally contain a number of material exchange portions which are separated by spaces, liquid collectors of known construction are placed in the spaces between the exchange portions.

This permits liquid to flow from a material exchange portion into a collector and then into a liquid distributor disposed beneath the collector.

Referring to FIG. 2, during operation, liquid is supplied via the pipe 7 into the container 4 so as to provide a certain head of liquid therein. The liquid, in turn, is metered through the metering devices 4c into the respective flow channels 5. Each stream which flows through a feed channel 5 is then delivered via a respective feed pipe 6a into a manifold 6b and is then distributed to the individual pipes 6a. Thereafter, the liquid is then dispensed through the openings 6d in the pipes 6c onto the material exchange portion 2. The flow of liquid from the container 4 to the individual distributors (i.e. manifold 6b) occurs gravimetrically and achieves a substantially uniform distribution across the mass transfer portion 2.

Because of the substantially uniform distribution of the liquid onto the mass transfer portion 2, maldistribution can be kept small.

Figure 4:
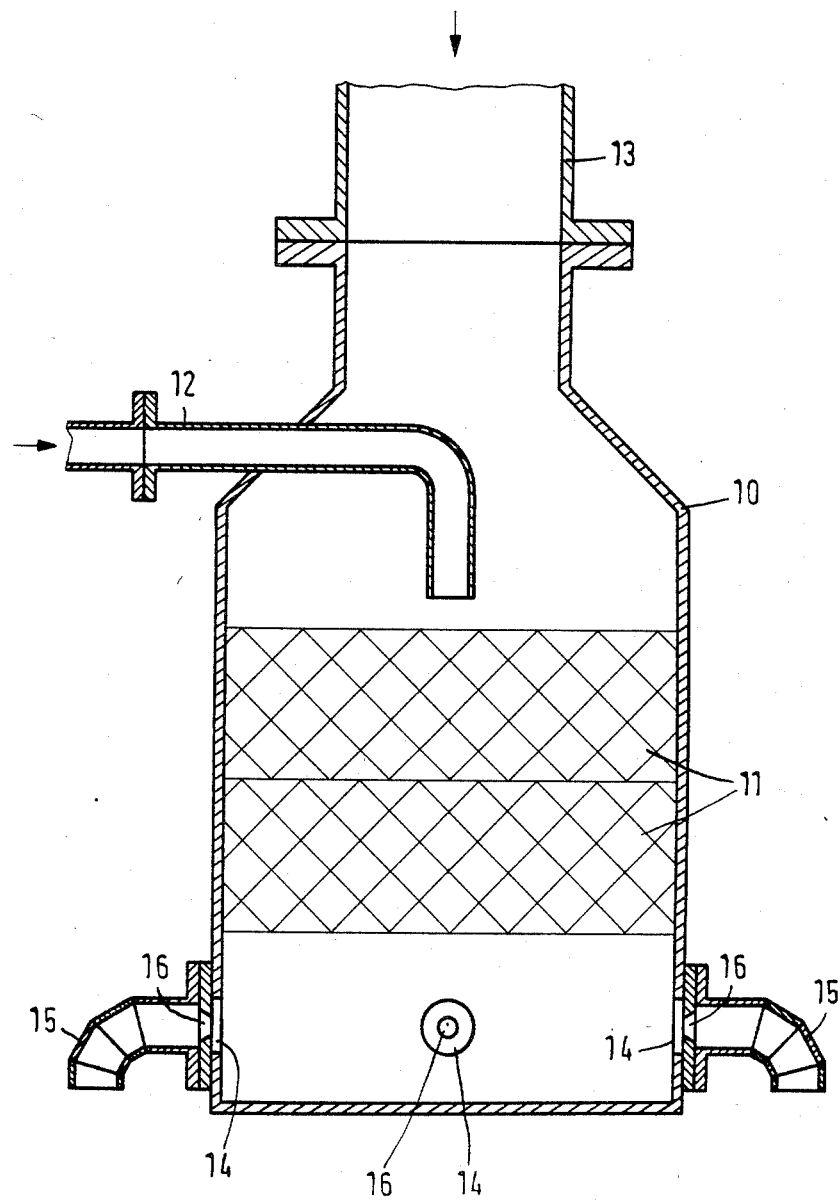
FIG. 4 illustrates a vertical sectional view of a modified column and liquid distributor in accordance with the invention.

Referring to FIG. 4, the liquid distribution device may be constructed in another manner. To this end, the device may have a container 10 which contains a pair of mixers 11 each of which is constructed as the static mixer described in Swiss Pat. No. 537,208. Mixers of this type are particularly advantageous in cases where the liquid to be distributed comes from more than one source, for example, when a reflux from an enrichment section of a rectification column is supplied to a stripping section while additional liquid is fed to the column from another source. As illustrated, liquid can be supplied through a line 12 while a reflux is provided through a line 13 flanged to the container 10.

A mixer may also be advantageous if the liquid comes from only one source having variations in concentration, for example, if the liquid comes from an exchange portion disposed in a column above the distributing device.

As shown in FIG. 4, the liquid distributing device has a plurality of openings 14 in the sidewalls at the bottom of the container 10 which communicate with pipe outlets 15 for dispensing partial flows of liquid. As also shown, a metering device 16 in the form of an orifice is disposed between each opening 14 and a pipe outlet 15 for metering the outflowing amounts of liquid.

The liquid distribution device of FIG. 4 functions in a similar manner to the embodiment illustrated in FIGS. 2 and 3. That is, the pipe outlets 15 communicate with feed channels (not shown) so as to deliver the metered partial streams of liquid to individual distributors.

The invention thus provides a liquid distribution device which permits a uniform distribution of liquid over the cross-section of a column. In this regard, the metering devices permit metered flows of liquid to be delivered to the respective individual distributors in proportional amounts. Thus, amounts of liquid in proportion to the cross-sectional areas of the exchange portions of the column to be supplied can be readily obtained.

The liquid distributing device is particularly suitable for columns having a large cross-section, for example having diameters of the order of three or more meters.

What is claimed is:

1. A device for gravimetric distribution of liquid for mass and heat transfer columns, said device comprising
a container for receiving a supply of liquid, said container having a plurality of outlets for the liquid;
a plurality of individual distributors, each distributor being disposed below and communicating in vented manner with a respective outlet of said container to receive liquid therefrom; and
a plurality of metering devices, each metering device being disposed in a respective outlet of said container for metering an amount of liquid to said respective distributor in proportion to the cross-sectional area of said respective distributor to the total cross-sectional area of said distributors.

2. A device as set forth in claim 1 wherein each metering device is a throttle.

3. A device as set forth in claim 1 which further comprises a mixer in said container for mixing a supply of liquid therein.

4. A device for gravimetric distribution of liquid for mass and heat transfer columns, said device comprising
a container for receiving a supply of liquid, said container having a plurality of outlets for the liquid;
a plurality of flow channels, each flow channel being in vented communication with and extending outwardly of a respective outlet of said container to receive and convey liquid therefrom;
a plurality of metering device, each metering device being disposed in a respective outlet of said container for metering a flow of liquid in said respective flow channel;
a plurality of pipe manifolds, each manifold being in vented communication with a respective flow channel to receive a metered flow of liquid; and
a plurality of pipes extending from each respective manifold to distribute liquid from each said respective manifold under gravity over a predetermined area.

5. In combination,
a column having a plurality of packing members disposed over a cross-section thereof; and
a liquid distributor in said column over said packing members for distributing liquid over said column cross-section, said liquid distributor including a container for receiving liquid, a plurality of outlets in said container for the liquid, a plurality of individual distributors, each said distributor being disposed below and communicating in vented manner with a respective outlet of said container to receive liquid therefrom and a plurality of metering devices, each metering device being disposed in a respective outlet of said container for metering a flow of liquid from said container to said respective distributor.

6. The combination as set forth in claim 5 wherein said column is of cylindrical cross-section with a diameter of at least three meters.

7. The combination as set forth in claim 5 wherein said distributor includes a mixer in said container for mixing a supply of liquid therein.

8. The combination as set forth in claim 7 wherein said liquid distributor includes a supply pipe extending into said container to deliver a supply of liquid thereto and a return line connected to said container to deliver a return flow of liquid thereto above said mixer.

* * * * *